July 26, 1938.   F. C. JEARUM   2,125,005
ADJUSTABLE TURNING AND BORING TOOL
Filed July 11, 1936
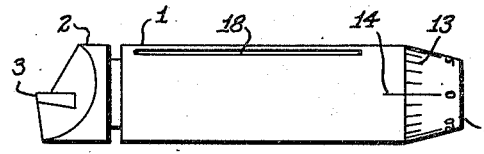
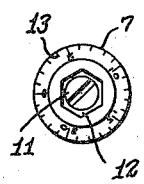
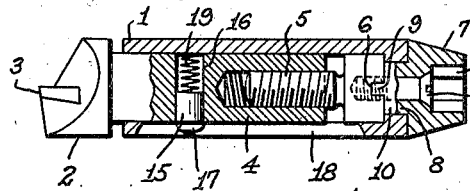
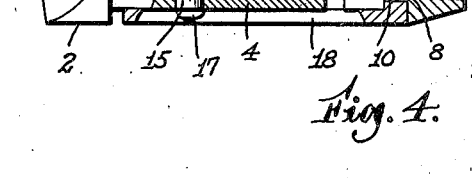
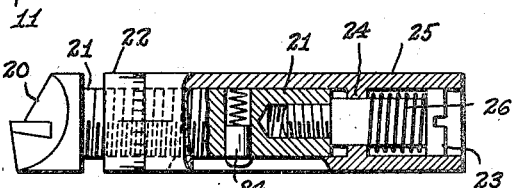
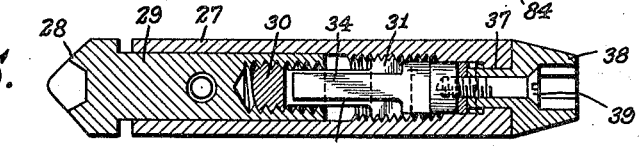
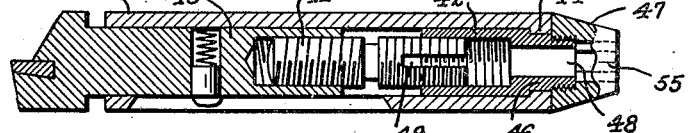
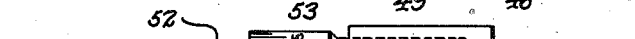
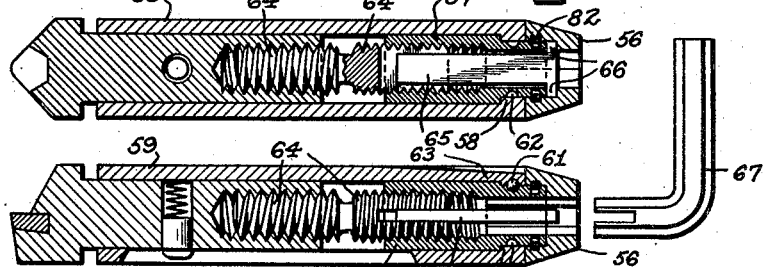
Inventor
F. C. JEARUM Patented July 26, 1938

2,125,005

UNITED STATES PATENT OFFICE 2,125,005

ADJUSTABLE TURNING AND BORING TOOL

Frederick Charles Jearum, Chipstead, England

Application July 11, 1936, Serial No. 90,051
In Great Britain August 17, 1935

16 Claims. (Cl. 29—96)

This invention relates to adjustable turning and boring tools and, more particularly, to turning and boring tools having cutting bits adjustable along and relative to a supporting shank adapted to be clamped in tool holders, boring bars and the like. It is a drawback in the customary method of using turning and boring tools having super-hard tips of diamond or tungsten carbide type that in the first place the tip is liable to be damaged in the adjusting operations, usually performed by tapping backward or forward, and in the second place that the haphazard result of adjustments so performed tends to vitiate the accuracy of cutting of which such tools are capable. It is the purpose, therefore, of the constructions exemplifying the present invention, to eliminate doubt as to the degree of adjustment performed by employing positive and graduated adjusting means for effecting and controlling the setting of the tool to the work.

Accordingly, the invention provides an adjustable tool-bit of the kind described above having a member bearing a cutting tip of the type referred to, a body member whereby the bit may be clamped in an operating position and definitely progressive adjusting means for adjusting the position of said cutting-tip bearing member with respect to said body member substantially in the direction of the depth of cut.

In order to illustrate the nature of the means provided in accordance with the invention, embodiments are herein described with reference to the drawing which accompanies this specification, and wherein, Fig. 1 is a longitudinal elevation of an adjustable tool bit intended for use in a boring bar and provided with means for giving adjustment by rotating a graduated head, Fig. 2 is a rear end elevation thereof, Fig. 3 is a view similar to Fig. 1 but showing a portion of the tool in longitudinal section, Fig. 4 is a view in elevation and longitudinal section of a simplified form of the invention, Fig. 5 is a longitudinal horizontal section of a modified tool provided with a differential adjusting means by which a much finer degree of adjustment is made possible, Fig. 6 is a longitudinal vertical sectional view of the tool shown in Fig. 5, Fig. 7 is a longitudinal vertical section of a tool constructed to provide for both coarse and fine adjustments independently, Fig. 8 is a longitudinal elevation of a key for adjusting the tool shown in Fig. 7, and Figs. 9 and 10 are respectively longitudinal horizontal and vertical sections of a modification of the construction shown in Fig. 7.

In Figures 1, 2, and 3, a shell, 1, is adapted to be clamped in holding means in the toolholder or boring bar in which the tool is required to be used. A nose, 2, carrying an inserted, super-hard tip, 3, is slidable within the shell, 1, and is furnished at its inner end with a tapped shank, 4, which engages with a threaded bolt, 5, having a transverse keyway, 6, at its rear end, the screwed portions being preferably left handed. The adjusting head, 7, has a spigot, 8, by which the head, 7, is centered in the shell, 1, and has a transverse key, 9, protruding through the internal collar, 10, of the shell, 1, and engaging with the said keyway, 6. A screw, 11, clamps the head, 7, to the bolt, 5, thereby retaining the key, 9, in engagement with the keyway, 6, and preserving the bolt, 5, in constant axial relation to the internal collar, 10, and thus to the shell, 1.

The head, 7, is provided, as shown in Figure 2, with a hexagonal recess, 12, by which it may be rotated with the employment of a hexagonal key of well-known type, and the degree of adjustment may be read by noting the relation of the graduations, 13, on the head, 7, to the reader mark, 14, on the adjacent part of the shell, 1.

In order to prevent the nose, 2, with its shank, 4, from rotating with respect to the shell, 1, a sprung key, 15, is contained in a pocket, 16, in the shank, 4, the key, 15, being furnished with a feather 17, across its outer end, the said feather, 17, engaging with one of three longitudinal slots, 18, formed in the shell, 1, a spring 19, contained in the pocket, 16, serving to maintain the feather, 17, in engagement with the said slot, 18. This arrangement admits of the tool bit being readily taken apart when the key, 15, is pressed into its pocket, 16, sufficiently to disengage its feather, 17, from the slot, 18.

The slots, 18, in the shell, 1, Figure 1, also allow a slight contraction of the shell onto the shank, 4, under pressure of the clamping means of the toolholder, thereby providing for the greater stability of the shank, 4, and the nose, 2, in which the cutting tip, 3, is mounted.

In Figure 4, is shown a simplified form which is adequate for some purposes. Here the cutter head, 20 has its shank, 21, threaded immediately behind its shoulder and a graduated ring, 22, is tapped to fit the shank, 21. The rear end of the shank, 21, is tapped for a shouldered screw, 23, which passes through a collar, 24, inside the shell, 25. Between the head of the screw, 23, and the said collar, 24, is a spring, 26, tending to withdraw the shank, 21, into the shell, 25. The extent to which this is permitted is determined by the adjustment of the ring, 22, as it bears against the forward end of the shell, 25. The shell, 25, is slit longitudinally as in the former case and a spring key, 34, prevents the shank, 21, from rotation in the shell, 25.

In Figures 5 and 6, a modified construction is shown. In this, the shell, nose and shank, are indicated by 27, 28, and 29, respectively; but, here, the bolt, 30, which is tapped into the shank, 29, with a thread of a particular pitch, is constrained axially of the shell by having its head, 31, threaded with a somewhat finer pitch and engaging with a similar thread tapped into a portion, 32, of the shell, 27, itself.

In this case, both screws are left handed. The bolt, 30, is also slotted as shown at, 33, to embrace a flat stem, 34, which is furnished with a transverse keyway, 35, in a manner similar to that of the bolt, 5, of Figure 1, the keyway, 35, engaging with a key, 36, formed on the spigot, 37, of the adjusting head, 38. A screw, 39, clamps the head, 38, to the stem, 34, and retains both in the shell, 27, as in the former case.

Supposing that the shank, 29, and the bolt, 30, have a thread of slightly coarser pitch than that on the head, 31, and in the portion, 32, of the shell, 27, then the rotation of the bolt, 30, by the stem, 34, will move the shank, 29, in one turn, a distance corresponding to the difference between the pitches of the respective threads. Thus, in a particular case, if the bolt threads are 40 per inch, and those on the head of the bolt 50 per inch, one turn of the bolt will move the shank $1/40 - 1/50 = 1/200$ of an inch. If, now, the head, 38, be graduated with 50 divisions, each division will represent a movement of the shank, 29, of $1/10,000$ of an inch.

In this construction also, a sprung key, 40, prevents rotation of the shank, 29, in the shell, 27.

Figure 7 illustrates a construction similar to that shown in Figures 5 and 6, but in which the coarser screw can be employed independently to give preliminary settings upon which fine adjustments may be superimposed subsequently.

For this purpose, the bolt, 41, is of uniform diameter, screwed with the coarser thread for half its length and the finer for the remainder. The finer thread engages with a tapped hole in a sleeve, 42, of substantially the same outside diameter as the shank, 43. This sleeve, 42, is retained axially by an internal collar, 44, in the shell, 45, and has a spigot, 46, passing through this collar, upon which is fixed the adjusting head, 47. The spigot, 46, has an axial hole, 48, and the bolt, 41, has a long slot, 49. An operating key 50 (Fig. 8) is formed partly as a flat blade 51 and partly as a hexagonal body 52.

The key-body, 52, has, slidably mounted upon it, a collar, 53, lightly sprung to bear against the head, 47, when the key is inserted into the latter. When the key is fully inserted, the blade, 51, engages the slot, 49, in the bolt, 41, and the body, 52, engages the head, 47. Now, if the key is turned, the head, 47, the sleeve, 42, and the bolt, 41, all turn as a solid and the adjustment of the shank, 43, will be by the coarser screw, only. Should the key be allowed to emerge somewhat, so that the body, 52, is clear of the head, 47, and the collar, 53, still bears against the head, 47, operation of the key causes the bolt, 41, only, to rotate and the adjustment will be made as in the construction shown in Figures 4, 5, and 6, the degree of adjustment being indicated by the graduations, 54, on the collar, 53, and the reader mark, 55, on the head, 47.

In a further modification shown in Figures 9 and 10, the head, 56, is so fitted to the sleeve, 57, as to be free to rotate thereon, although constrained axially by the split ring 82, in well-known manner. The sleeve, 57, is formed, within the collar, 58, in the shell, 59, with a number of recesses or pits, 62, and the shell, 59, is slit longitudinally for some distance, so as to leave a tongue, 63, the free end of which, was a portion of the collar, 58. The exterior of this tongue, 63, is somewhat tapered inwards to its free end, as shown by the line, 60, and the inner portion of its free end is relieved so that a ball, 61, having a diameter equal to the width of the tongue, may be retained in one of the pits, 62, in the sleeve, 57, by the said tongue. With this construction the key, 67, does not require to be fitted with the former sliding graduated collar, as the head, 56, is made to serve for measuring either the coarse or the fine adjustment.

In this case, a blade member, 65, is recessed at its rearward end, 66, into the head, 56, so as to turn therewith, and permanently engages the slot in the bolt, 64, passing freely through the hexagonal hole in the sleeve, 57.

The thickness of the blade is such that the operating key, 67, when slotted as shown, may be inserted through the head, 56, and engages the hexagonal hole, 85, in the sleeve, 57, thus being enabled to turn the head, the sleeve, and the bolt, as a solid, to give the coarser adjustment. When the key, 67, is inserted, to engage the head, 56, only, and not the sleeve, the latter is retained stationary by the ball, 61, and the rotation of the head, 56, with the blade, 65, effects the finer adjustment.

It will be seen that when the tool is used in a boring bar, the importance of the entire construction being kept within the normal diameter of the tool bit is considerable, as is also the transfer of the clamping pressure to the shank itself, whereby the nose leaving the cutting tip, is prevented from loss of rigidity.

What I claim is:—

1. A tool of the class described, comprising a tubular shell, a tool holding head projecting from the forward end of the shell and having a shank extending axially into such end and supported on the inner wall of the shell, and screw threaded means located axially of and within the shell and cooperating with the shell and the rear end of the shank to hold the shank and the head against axial movement forwardly and rearwardly and including a rotary member for adjusting the shank and head axially of the shell, and means at the rear end of the shell having a key and slot rotating connection with the member, the shank continuously fitting the inner wall of the shell from a point closely adjacent to the head to a point remote therefrom whereby securely to support the head in retracted and extended positions.

2. A tool of the class described, comprising a tubular shell, a tool holding head projecting from the forward end of the shell and having a cylindrical shank extending axially into such end and fitting the inner wall of the shell from said forward end rearwardly, screw threaded means within the shell and in threaded engagement with the rear end of the shank, calibrated means at the rear end of the shell for rotating the screw threaded means and adjusting the head longitudinally a predetermined amount, and means connecting the calibrated means to the screw threaded means whereby rotation of the former rotates the latter and whereby the latter is held against longitudinal movement.

3. A tool of the class described, comprising a tubular shell, a tool holding head projecting from the forward end of the shell and having a cylindrical shank extending axially into such end and fitting the inner wall of the shell from said forward end rearwardly, and a screw threaded member located axially of and within the shell, said member having threads of different character cooperating respectively with the shell and the rear end of the shank.

4. The tool defined in claim 3 in which said threads are of different pitch and in threaded engagement respectively with the shell and the rear end of the shank.

5. A tool of the class described, comprising a tubular shell having a cylindrical bore therein, a tool holding head projecting from the forward end of the shell and having a cylindrical shank slidably fitting the cylindrical wall of the bore from the forward end of the shell rearwardly, a screw in the shell having two threaded portions respectively of relatively coarse and fine pitch and respectively in threaded engagement with the rear end of the shank and the shell, and means including a rotary member at the rear end of the shell so connected to the screw as to cause the screw to rotate with the member.

6. The tool defined in claim 5 in which said means includes a member having engagement with the screw and preventing their relative rotation but permitting relative movement longitudinally of the shell, and means holding the first and second named members from separating movement longitudinally of the shell.

7. A tool of the class described, comprising a tubular shell having a longitudinal bore therethrough, a tool holding head projecting from the forward end of the shell and having a shank extending into the bore and supported for longitudinal movement on the wall thereof, a sleeve in the shell rearwardly of and in alignment with the shank, a screw in the shell having two threaded portions respectively of relatively coarse and fine pitch and respectively in threaded engagement with the rear end of the shank and the sleeve, and means preventing axial movement of the sleeve, the sleeve and screw being rotatable as a unit and the screw being rotatable independently of the sleeve.

8. A tool of the class described, comprising a tubular shell having a longitudinal bore therethrough, a tool holding head projecting from the forward end of the shell and having a shank extending into the bore and supported for longitudinal movement on the wall thereof, a sleeve in the shell rearwardly of and in alignment with the shank, a screw in the shell having two threaded portions respectively of relatively coarse and fine pitch and respectively in threaded engagement with the rear end of the shank and the sleeve, means preventing axial movement of the sleeve, means for rotating the sleeve and screw as a unit or rotating the screw independently of the sleeve, and means for indicating the degree of tool head adjustment effected by such rotation.

9. A tool of the class described, comprising an elongated shell having a longitudinal bore therein cylindrical from the forward end of the shell rearwardly, a tool holding head projecting from the forward end of the bore and having a supporting shank cylindrical therealong rearwardly from a point closely adjacent to said head and slidably fitting within the bore, and screw threaded means coaxial of the central longitudinal axis of the shell and cooperating with the shank and shell to hold the shank and head against axial movement rearwardly and including a rotary member for adjusting the shank and head axially of the shell.

10. The tool defined in claim 9 in which the shell is laterally compressible into binding engagement with the shank.

11. The tool defined in claim 9 in which the shank is prevented from rotation within the shell by a key within the shank spring-pressed outwardly into a slot extending longitudinally of and through the shell.

12. A tool of the class described, comprising a tubular shell having a bore therethrough cylindrical at and rearwardly of its forward end, a tool holding head projecting from the forward end of the bore and having a supporting shank cylindrical therealong to a point closely adjacent to said head and slidably fitting within the bore, and screw threaded means located axially of the shell and cooperating with the shank and shell to hold the shank and head against axial movement rearwardly and including a rotary member for adjusting the shank and head axially of the shell, the shell being slotted longitudinally whereby rendering it compressible into binding engagement with the shank.

13. A tool of the class described, comprising a tubular shell having a longitudinal bore therein of greater diameter than the thickness of the shell wall and cylindrical from the forward end of the shell rearwardly, a tool holding head of a radial size substantially corresponding with the shell and having a reduced cylindrical shank extending axially into the forward end of the bore and supported on the wall thereof from the forward end of the shell rearwardly, and screw threaded means located axially of and within the shell and cooperating with the shank and shell to adjust the shank and head to different axial positions and hold them in such positions relative to the shell, the cylindrical shank being constructed continuously to fit the walls of the bore from a point closely adjacent to the head to a point remote therefrom whereby securely to support the head in retracted and extended positions.

14. The tool defined in claim 13 plus calibrated means at the rear end of the shell and of a radial size substantially corresponding with the shell for rotating the screw threaded means and indicating the resulting adjustment of the head.

15. A tool of the class described, comprising a tubular shell having a cylindrical bore therein, a tool holding head projecting from the forward end of the shell and having a cylindrical shank slidably fitting the wall of the bore from the forward end of the shell rearwardly, a screw in threaded engagement with the rear end of the shank, a shoulder integral with the shell and preventing rearward movement of the screw in the bore, and means including a rotary member at and engaging the rear end of the shell and so connected to the screw as to prevent forward movement thereof and cause the screw to rotate with the member.

16. The tool defined in claim 15 in which said means includes co-engaging transverse shoulders between the screw and member, and means holding the member and shell from separating movement longitudinally.

FREDERICK CHARLES JEARUM.